UNITED STATES PATENT OFFICE 2,380,061

CYANOMETHYL ESTERS OF DICARBOXYLIC ACIDS

David T. Mowry, Dayton, Ohio, assignor to Monsanto Chemical Company, St. Louis, Mo., a corporation of Delaware No Drawing. Application September 27, 1943,
Serial No. 504,047

5 Claims. (Cl. 260—464)

The present invention relates to new esters of glycolonitrile, more particularly to esters of glycolonitrile with fumaric acid or mesaconic acid, and to methods of producing the same.

This invention has as an object the provision of useful, new esters of glycolonitrile. Another object of the invention is the preparation of new, unsaturated esters of glycolonitrile capable of forming polymers and copolymers for use in the plastic and coating industries.

These objects are accomplished by the following invention wherein there are prepared unsaturated esters of glycolonitrile having the general formula:

NC.CH₂.OOC.CH:CR.COO.CH₂CN wherein R is a member of the group consisting of hydrogen, chlorine and methyl. Examples of compounds having the above general formula are bis(cyanomethyl) fumarate, bis(cyanomethyl) mesaconate and bis(cyanomethyl) alpha-chlorofumarate.

These new esters are readily obtainable by reaction of glycolonitrile with a fumaryl halide, a mesaconyl halide or a chlorofumaryl halide according to the equation:

XOC.CH:CR.COX+2HO.CH₂CN→
NC.CH₂.OOC.CH:CR.COO.CH₂CN+2HX wherein R stands for hydrogen, chlorine or methyl and X stands for halogen, i. e., chlorine, bromine, iodine or fluorine.

Esters of the above general formula are also obtainable by reaction of a fumaryl halide, a mesaconyl halide or a chlorofumaryl halide with a mixture of formaldehyde and an alkali metal cyanide such as potassium cyanide or sodium cyanide substantially according to the following equation:

XOC.CH:CR.COX+2HCHO+2NaCN→
NC.CH₂.OOC.CH:CR.COO.CH₂CN+2NaX wherein R stands for methyl, chlorine or hydrogen and X stands for halogen.

As examples of the acyl halides that may be employed in the two reactions given above may be mentioned fumaryl chloride, fumaryl bromide, fumaryl fluoride, fumaryl iodide, mesaconyl chloride, mesaconyl bromide, mesaconyl fluoride, mesaconyl iodide, chlorofumaryl chloride, chlorofumaryl bromide, etc.

Still another method for the preparation of cyanomethyl fumarate or cyanomethyl mesaconate involves the dehydrohalogenation of bis(cyanomethyl) chlorosuccinate or bis(cyanomethyl) chloropyrotartrate, for example, by heating in the presence of quinoline or another basic reacting organic or inorganic compound, substantially according to the reaction:

NC.CH₂.OOC.CHCl.CHR.COO.CH₂CN →<sub>base</sub>
NC.CH₂.OOC.CH:CR.COO.CH₂CN wherein R stands for hydrogen or methyl.

While a number of saturated esters of glycolonitrile are known, as far as I have been able to ascertain, the fumaric, chlorofumaric or mesaconic esters of glycolonitrile have not been previously prepared. Glycolonitrile, itself, polymerizes rather rapidly to a colorless crystalline mass, and in the prior art its esters were generally prepared by indirect methods, i. e., glycolonitrile was not employed as a constituent of the reaction mixture in reactions involving the preparation of its esters. For example, Henry (Bull. soc. chim. (2) 46, 42; Recueil trav. chim. 24, 170) prepared the acetate, the propionate and the butyrate of glycolonitrile by reaction of chloroacetonitrile with the potassium salt of acetic acid, propionic acid or butyric acid, respectively. In the preparation of the benzoate of glycolonitrile the nitrile was formed in situ, benzoyl chloride being reacted with a mixture of potassium cyanide and formaldehyde instead of with glycolonitrile (J. Aloy and C. Rabaut. Bull. soc. chim. 13, (4) 457–60). Only in the preparation of the carbonates has glycolonitrile been previously employed as an esterifiable alcohol. In U. S. Patents Nos. 2,266,199 and 2,307,679, Hechenbleikner reacts glycolonitrile with phosgene to obtain cyanomethyl carbonate or cyanomethyl chloroformate, respectively. It is well known, however, that phosgene is an especially reactive acyl halide and that its reactivity is not necessarily typical of other acyl halides. Since no acyl halide other than phosgene has been previously reacted with glycolonitrile to yield esters thereof, the production of unsaturated esters of glycolonitrile by reaction of the same with unsaturated acyl halides could not have been anticipated.

Also, although an aromatic ester of glycolonitrile, i. e., the benzoate, has been previously prepared by reaction of the acyl halide with a mixture of an alkali metal cyanide and formaldehyde in aqueous solution, the course of a parallel reaction with a fumaryl halide or a mesaconyl halide could not have been predicted, for benzoyl chloride is an acid chloride which is known to react with alcohols in the presence of aqueous alkalies as, for example, in the Schotten-Baumann reaction, whereas the aliphatic halides are generally known to hydrolyze in such reactions. Moreover, many unsaturated acyl halides are known to undergo auto-condensation or polymerization in the presence of alkaline reagents. Likewise, the production of complex cyanohydrins, instead of the fumarates or the mesaconate of glycolonitrile may have been expected to occur by addition of hydrogen cyanide at the olefinic double bond of the fumaryl halide or the mesaconyl halide. The production of the fumarates or the mesaconate of glycolonitrile by reaction of an aqueous mixture of formaldehyde and an alkali metal cyanide with a fumaryl halide or a mesaconyl halide consequently could not have been predicted.

The invention is further illustrated, but not limited, by the following examples:

Example 1

Bis(cyanomethyl)mesaconate.—85 grams (1.49 mols) of glycolonitrile was added dropwise, with stirring, to an ice-cooled mixture of 124 grams (0.74 mol) of mesaconyl chloride and 180 grams (1.49 mols) of dimethylaniline in 500 ml. of anhydrous ether at a temperature of 4° C. to 8° C. After addition was complete the mixture was allowed to attain room temperature and was stirred at this temperature for an additional 16 hours. At the end of this time, water was added to the reaction mixture, the ether layer was removed, washed three times with aqueous sodium carbonate, twice with dilute hydrochloric acid, and then twice with water. The ether was removed from the product by distillation under diminished pressure and there was obtained as residue 117 grams (76% theoretical yield), of the crude, rather dark, oily bis(cyanomethyl)mesaconate which did not solidify in a dry-ice bath. The crude ester was insoluble in cold absolute alcohol or ligroin and soluble in benzene and acetone. Distillation of the crude product gave 77 grams (50% theoretical yield) of the substantially pure bis(cyanomethyl)mesaconate, B. P. 193°–195° C. (3 mm.), which upon subsequent redistillation gave 66 grams (42.8% theoretical yield) of the purer, yellow, oily bis(cyanomethyl)mesaconate, B. P. 191.5°–193° C. (3 mm.), $n_D^{24}$ 1.4817 and analyzing as follows:

|  | Percent C | Percent H | Percent N |
|---|---|---|---|
| Calcd. for $C_9H_8O_4N_2$ | 51.92 | 3.87 | 13.46 |
| Found | 52.50 | 3.98 | 13.42 |

Bis(cyanomethyl)mesaconate yields highly heat-resistant resinous copolymers with styrene or methyl methacrylate and rubbery copolymers of good thermal properties and elasticity when copolymerized with butadiene.

Example 2

Bis(cyanomethyl)fumarate.—60 grams (1.05 mols) of glycolonitrile was added dropwise, with stirring and cooling in ice, to a mixture of 78 grams (0.52 mol) of fumaryl chloride and 120 grams of dimethylaniline in 500 cc. of anhydrous ether at a temperature of from 5° C. to 10° C., the addition being completed within a period of about one hour. At the end of this time the ice-bath was removed, and the reaction mixture was stirred at room temperature for about 3 hours. A heavy, oily material was formed which upon addition of water and standing overnight changed to a voluminous precipitate that was not very soluble in either water or ether. This was filtered off and washed with water and dried to give a solid product weighing 63 grams. Upon treatment of this solid with an aqueous solution of 80 grams of sodium carbonate, filtering and washing with water, acidification with dilute hydrochloric acid and drying, there was obtained 41 grams of a crystalline material, M. P. 80° C. to 83° C. Recrystallization of the product from hot benzene, using Nuchar, gave 31 grams of almost colorless, transparent plates of the pure bis(cyanomethyl)fumarate, melting sharply at 83° C. and analyzing as follows:

|  | Percent C | Percent H | Percent N |
|---|---|---|---|
| Calcd. for $C_8H_6O_4N_2$ | 49.50 | 3.11 | 14.43 |
| Found | 49.68 | 3.02 | 14.38 |

Bis(cyanomethyl)chlorofumarate is obtainable in substantially the same manner when the fumaryl chloride employed above is substituted by chlorofumaryl chloride.

Instead of using ether as the solvent in the reactions of the preceding examples, there may be employed any inert solvent, for example, chloroform, carbon tetrachloride, benzene, xylene, etc. Likewise, instead of using dimethylaniline as the reaction catalyst I may use any other basically reacting compound which is soluble in or miscible with the reaction components, i. e., the glycolonitrile and the acyl halide. As basically reacting catalysts which have been generally found useful for this purpose may be mentioned trimethylamine, pyridine, quinoline, morpholine, or other cyclic or tertiary amines.

While bis(cyanomethyl)mesaconate, bis(cyanomethyl)fumarate and bis(cyanomethyl)chlorofumarate are particularly contemplated for use in the production of resinous materials, as disclosed in the copending application of Raymond B. Seymour and David T. Mowry, Serial No. 504,048, filed September 27, 1943, they also find use either as insecticides and fungicides or as intermediates in the preparation of materials having insecticidal, fungicidal, rot-proofing and water-proofing properties.

From the foregoing disclosure it will be recognized that the invention is susceptible of modification without departing from the spirit and scope thereof, and it is to be understood that the invention is limited only by the following claims.

What I claim is:

1. Compounds having the formula:

NC.CH₂.OOC.CH:CR.COO.CH₂CN where R is selected from the group consisting of hydrogen, chlorine and methyl.
2. Bis(cyanomethyl)fumarate.
3. Bis(cyanomethyl)mesaconate.
4. Bis(cyanomethyl)alpha-chlorofumarate.
5. The process which comprises reacting a compound having the formula:

XOC.CH:CR.COX where R is selected from the group consisting of hydrogen and methyl and X is halogen, with glycolonitrile in the presence of a basic catalyst.

DAVID T. MOWRY.